(12) United States Patent
Hamabe et al.

(10) Patent No.: US 8,725,191 B2
(45) Date of Patent: May 13, 2014

(54) WIRELESS COMMUNICATION SYSTEM, WIRELESS COMMUNICATION METHOD, BASE STATION, CONTROL METHOD OF BASE STATION, AND CONTROL PROGRAM OF BASE STATION

(75) Inventors: Kojiro Hamabe, Minato-ku (JP); Motoki Morita, Minato-ku (JP)

(73) Assignee: NEC Corporation, Tokyo (JP)

( * ) Notice: Subject to any disclaimer, the term of this patent is extended or adjusted under 35 U.S.C. 154(b) by 623 days.

(21) Appl. No.: 12/682,191

(22) PCT Filed: Sep. 22, 2008

(86) PCT No.: PCT/JP2008/067072
§ 371 (c)(1),
(2), (4) Date: Apr. 8, 2010

(87) PCT Pub. No.: WO2009/047972
PCT Pub. Date: Apr. 16, 2009

(65) Prior Publication Data
US 2010/0248735 A1   Sep. 30, 2010

(30) Foreign Application Priority Data
Oct. 9, 2007  (JP) ................. 2007-263050

(51) Int. Cl.
| | | |
|---|---|---|
| H04B 17/00 | (2006.01) | |
| H04B 7/00 | (2006.01) | |
| H04B 1/00 | (2006.01) | |
| H04W 68/00 | (2009.01) | |
| H04W 68/02 | (2009.01) | |
| H04W 68/06 | (2009.01) | |

(52) U.S. Cl.
CPC ........... *H04W 68/005* (2013.01); *H04W 68/00* (2013.01); *H04W 68/02* (2013.01); *H04W 68/06* (2013.01)
USPC .................... 455/522; 455/69; 455/67.11

(58) Field of Classification Search
CPC .................................................. H04W 68/005
USPC .......... 455/522, 69, 67.11, 67.13, 63.1, 226.1
See application file for complete search history.

(56) References Cited

U.S. PATENT DOCUMENTS

| | | | |
|---|---|---|---|
| 6,035,208 A | 3/2000 | Osawa | |
| 6,366,763 B1 * | 4/2002 | Ue et al. | ................ 455/69 |

(Continued)

FOREIGN PATENT DOCUMENTS

| | | |
|---|---|---|
| GB | 2 428 937 A | 2/2007 |
| JP | 1998-013909 A | 1/1998 |

(Continued)

OTHER PUBLICATIONS

3GPP TS 25.214 v7.3.0 Technical Specification, 3rd Generation Partnership Project; Technical Specification Group Radio Access Network; Physical layer procedures (FDD) (Release 7), 3GPP, pp. 1-60, Dec. 2006.

(Continued)

*Primary Examiner* — Tilahun B Gesesse
(74) *Attorney, Agent, or Firm* — Sughrue Mion, PLLC

(57) ABSTRACT

To provide appropriate communication quality for a mobile station that is permitted to connect to a femto base station regardless of the place at which the femto base station is installed and the place at which the mobile station is used while reducing the transmission power of the femto base station as much as possible, a femto base station 4 measures the reception quality (e.g., received power or reception SIR) by receiving a common pilot signal from a macro base station 3, and sets the transmission power Ptx of a pilot signal to be transmitted by the femto base station itself based on the received power. Further, the femto base station 4 transmits a common pilot signal with a transmission power Ptx and communicates with a plurality of mobile stations 7-2 to 7-4 within a femtocell 6. Furthermore, the femto base station 4 receives a measurement result of the reception quality level of a common pilot signal transmitted from the femto base station 4 from the mobile stations 7-2 to 7-4, and adjusts the transmission power Ptx of a common pilot signal so that the lowest level among a plurality of reception quality levels gets closer to a predetermined target level.

22 Claims, 9 Drawing Sheets

(56) References Cited

U.S. PATENT DOCUMENTS

| | | | |
|---|---|---|---|
| 6,370,359 B1* | 4/2002 | Ue et al. | 455/69 |
| 6,381,445 B1* | 4/2002 | Ue et al. | 455/69 |
| 6,400,929 B1* | 6/2002 | Ue et al. | 455/69 |
| 6,487,394 B1* | 11/2002 | Ue et al. | 455/69 |
| 6,505,035 B2* | 1/2003 | Ue et al. | 455/69 |
| 6,597,894 B1* | 7/2003 | Ue et al. | 455/69 |
| 6,611,676 B2* | 8/2003 | Ue et al. | 455/69 |
| 6,973,289 B2* | 12/2005 | Ue et al. | 455/69 |
| 7,636,551 B2* | 12/2009 | Ue et al. | 455/63.1 |
| 2002/0068534 A1* | 6/2002 | Ue et al. | 455/92 |
| 2002/0077064 A1* | 6/2002 | Ue et al. | 455/69 |
| 2002/0082039 A1* | 6/2002 | Ue et al. | 455/522 |
| 2004/0198408 A1 | 10/2004 | Dillon et al. | |
| 2006/0019610 A1* | 1/2006 | Ue et al. | 455/69 |
| 2009/0042593 A1* | 2/2009 | Yavuz et al. | 455/522 |
| 2013/0301422 A1* | 11/2013 | Caretti et al. | 370/241 |

FOREIGN PATENT DOCUMENTS

| | | |
|---|---|---|
| JP | 2001-339341 A | 12/2001 |
| JP | 2005-073290 A | 3/2005 |
| JP | 2005-515648 A | 5/2005 |

OTHER PUBLICATIONS

3GPP TS 36.300 v8.1.0 (Jun. 2007) Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 1-106, Jun. 2007.

* cited by examiner

WIRELESS COMMUNICATION SYSTEM, WIRELESS COMMUNICATION METHOD, BASE STATION, CONTROL METHOD OF BASE STATION, AND CONTROL PROGRAM OF BASE STATION

TECHNICAL FIELD

The present invention relates to a wireless communication system, in particular a wireless communication system, a wireless communication method, and a base station in which at least one of base stations autonomously sets the transmission power of a common pilot signal.

BACKGROUND ART

In recent years, as the demand for indoor voice communication and data communication has grown due to the spread of mobile phones, the development of a home-use base station installed indoors has been pursued. As a form of operation of such a home-use base station, a way of implementing communication in which only a pre-registered mobile phone(s) is connected to a home-use base station has been studied. Since a range covered by a home-use base station is considerably smaller than that of a base station installed outdoors, the range is called "femtocell". Accordingly, a home-use base station is referred to as "femto base station" hereinafter.

Femto base stations as well as base stations in existing mobile communication networks transmit a common pilot signal. A mobile station performs synchronization establishment, channel estimation, and the like by receiving such a common pilot signal, and then performs data transmission/reception with a base station. Therefore, it is necessary to be able to receive a common pilot signal with appropriate receiving quality in a mobile station in order to provide appropriate communication quality.

In base stations in existing mobile communication networks, the transmission power of a common pilot signal to be transmitted in each cell is set in advance to a fixed value. In contrast to this, for common pilot signals transmitted by femto base stations in femtocells, a way of autonomously setting the transmission power by a femto base station has been studied. Patent document 1 (page 14, line 8 to page 15, line 21) discloses a method like this.

Its specific example is explained with reference to FIG. 8. Referring to FIG. 8, a macro base station 81 forms a macrocell 801 and transmits a common pilot signal CP1 with a constant transmission power to communicate with a mobile station (not shown). Femto base stations 91A and 91B form femtocells 802A and 802B respectively. Further, each of the femto base stations 91A and 91B measures a received power Pmacro [dBm] of the common pilot signal CP1 of the macro base station 81, and they transmit common pilot signals CP2A and CP2B respectively with a transmission power Pmacro+Poffset [dBm] by using the same radio frequency as that of the macro base station 81 to communicate with a mobile station (not shown). Note that Poffset is a constant value common to all the femtocells 802A and 802B.

The femto base station like the one described above has been studied for use in systems such as WCDMA and E-UTRAN. In WCDMA, data transmission is performed by using an individual channel, for which transmission power is controlled, on a uplink line and a downlink line, or is performed by using a shared channel on a downlink line as shown in Non-patent document 1. Further, in E-UTRAN, a radio frequency band is divided into a plurality of PRBs (Physical Resource Blocks) as shown in Non-patent document 2. A scheduler provided in an E-UTRAN base station assigns PRBs, and a base station performs data transmission with a mobile station by using an assigned PRB.

[Patent Document 1]
UK Patent Application Publication No. 2428937 A
[Patent Document 2]
Japanese Unexamined Patent Application Publication No. 10-013909
[Patent Document 3]
Published Japanese Translation of PCT International Publication for Patent Application, No. 2005-515648
[Patent Document 4]
Japanese Unexamined Patent Application Publication No. 2005-073290
[Non Patent Document 1]
3GPP TS 25.214 V7.3.0 (2006-12), 3rd Generation Partnership Project; Technical Specification Group Radio Access Network; Physical layer procedures (FDD) (Release 7)
[Non Patent Document 2]
3GPP TS 36.300 V8.1.0 (2007-06), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2

DISCLOSURE OF INVENTION

Technical Problem

Next, a case where each of the femto base stations 91A and 91B shown in FIG. 8 is installed inside a building 90 as shown in FIGS. 9A and 9B is analyzed. When a femto base station is installed indoors, there are two possible cases, i.e., a case where a femto base station 91A is installed near a window (near a window 901) as shown in FIG. 9A and a case where a femto base station 91B is installed a location far from a window 901 as shown in FIG. 9B. Further, for a mobile station that is to communicate with a femto base station 91A or 91B, there are also two possible cases, i.e., a case where a mobile station 92A is installed in a location far from a window 901 as shown in FIG. 9A and a case where a mobile station 92B is installed a location near a window 901 as shown in FIG. 9B.

A common pilot signal CP1 of a macro base station 81 that uses the same radio frequency as that of these femto base stations 91A and 91B enters the building 90 from the outside, and the common pilot signal CP1 attenuates with the increase in distance from the window 901. Further, an interference signal(s) that also enters the building from the macro base station 81 also attenuates with the increase in distance from the window 901.

Therefore, since the received power Pmacro of the common pilot signal CP1 in the femto base station 91B is smaller in comparison to that of the femto base station 91A, the transmission power of a common pilot signal CP2B of the femto base station 91B becomes also smaller. Accordingly, the received power of the common pilot signal CP2B in the mobile station 92B becomes smaller in comparison to that of a common pilot signal CP2A in the mobile station 92A. Further, the interference power from the macro base station 81 is larger in the mobile station 92B located near the window in comparison to that of the mobile station 92A. Therefore, the communication quality in the mobile station 92B is significantly poorer in compassion to that of the mobile station 92A. As described above, since indoor communication quality is significantly dependent on the place at which a femto base station is installed and the place at which a mobile station is used, there is a problem that invariant appropriate communication quality cannot be obtained.

To improve indoor communication quality, it is conceivable that the transmission power of the common pilot signals CP2A and CP2B of those femto base stations 91A and 91B should be set to a higher value. However, setting the transmission power of the common pilot signals CP2A and CP2B to a higher value poses another problem, in particular in the case of FIG. 9A, that if a mobile station 92C, which is not registered in the femto base station 91A, communicates with the macro base station 81 near the femto base station 91A, a transmission signal such as the common pilot signal CP2A of the femto base station 91A could significantly interfere with the downlink line of the mobile station 92C.

Meanwhile, Patent document 2 discloses a base station that monitors a traffic channel (its received power) transmitted from other base stations (base stations in a higher layer) and controls the transmission power of its own traffic channel according to the monitoring result. That is, the base station disclosed in Patent document 2 adjusts the transmission power of a traffic channel, but does not adjust the transmission power of a pilot signal, which is transmitted from the base station as a signal specifying the space covered by the base station and the radius of the cell, according to the reception level of a pilot signal transmitted from other base stations. Further, the base station disclosed in patent document 2 does not solve the above-described problem that "since indoor communication quality is significantly dependent on the place at which a femto base station is installed and the place at which a mobile station is used, invariant appropriate communication quality cannot be obtained".

Further, Patent document 3 discloses a supplementary base station that is provided to cover a dead zone that is not covered by other base stations. The supplementary base station measures the reception level of a pilot signal transmitted from other base stations and specifies its own transmission power so as not to create a dead zone. However, the supplementary base station disclosed in Patent document 3 does not solve the above-described problem that "since indoor communication quality is significantly dependent on the place at which a femto base station is installed and the place at which a mobile station is used, invariant appropriate communication quality cannot be obtained".

Further, an invention disclosed in Patent document 4 ensures that a pilot signal is sufficiently strong at any location within the space in which a communication system is installed, and its purpose is to prevent a dead zone from being created within the coverage area of the communication system. Therefore, a base station included in the communication system disclosed in Patent document 4 receives the reception level of a pilot signal measured by a mobile station from the mobile station and adjusts the transmission power of the pilot signal accordingly. However, as described above, if the transmission power of a pilot signal of a base station is simply increased, interference between cells becomes problematically larger. The communication system disclosed in Patent document 4 does not solve this problem.

Further, Patent document 5 discloses a base station that receives reception quality measured at a mobile station from the mobile station, and adjusts transmission power of a downlink channel to be transmitted to the mobile station accordingly. However, increasing the transmission power of a downlink channel simply in response to the low reception quality of the downlink channel measured by the mobile station could not sufficiently suppress interference within a cell and interference between cells.

The present invention has been made based on the above-described findings, and an object of the present invention is to provide a wireless communication system, a wires communication method, a base station, a control method of a base station, and a control program of a base station capable of providing appropriate communication quality for a mobile station that is permitted to connect to a femto base station regardless of the place at which the femto base station is installed and the place at which the mobile station is used while reducing the transmission power of the femto base station as much as possible.

Technical Solution

A wireless communication system in accordance with a first aspect of the present invention includes a first base station, a second base station, and at least one permitted mobile station. The first base station transmits a first pilot signal with a first transmission power within a first cell, and communicates with a mobile station. The second base station measures reception quality of the first pilot signal, sets a second transmission power based on the reception quality, transmits a second pilot signal with the second transmission power within a second cell, and communicates with a plurality of permitted mobile stations that are permitted to connect to the second base station. The permitted mobile station measures a reception quality level of the second pilot signal and reports a measurement result of the reception quality level to the second base station. Then, the second base station further adjusts the second transmission power based on the measurement result so that a lowest level among a plurality of reception quality levels each measured by each of the plurality of permitted mobile stations gets closer to a predetermined target level.

Further, a base station in accordance with a second aspect of the present invention includes: means to receive a first pilot signal from a first base station that transmits the first pilot signal with a first transmission power within a first cell and measure reception quality; means to set a second transmission power based on reception quality of the first pilot signal, transmit a second pilot signal with the second transmission power in a second cell, and communicate with a plurality of permitted mobile stations that are permitted to connect to that base station; and means to adjust the second transmission power based on a measurement result of a reception quality level of the second pilot signal reported from the plurality of permitted mobile stations so that a lowest level among a plurality of reception quality levels each measured by each of the plurality of permitted mobile stations gets closer to a predetermined target level.

Advantageous Effects

As described above, the second base station included in a wireless communication system in accordance with a first aspect of the present invention not only sets the transmission power of the second pilot signal (second transmission power) based on the reception quality (e.g., received power or reception SIR) of the first pilot signal transmitted from the first base station, but also receives a measurement result of the reception quality level of the second pilot signal by the permitted mobile station(s) that is permitted to connect to the second base station itself. Further, the second base station adjusts the transmission power of a pilot signal so that the minimum reception quality level among a plurality of measurement results gets closer to the predetermined target level. If a second transmission power is set according to the measurement result of the reception quality of a pilot signal by each of a plurality of permitted mobile stations, there is a possibility that when one of permitted mobile stations located near the second base station reports a measurement, the second transmission power could become smaller and the communication quality of a permitted mobile station located far from the second base station could deteriorate after the reporting. However, in accordance with the above-described second mobile station, even in a mobile station having the minimum communication quality level among the plurality of permitted mobile stations, appropriate communication quality can be obtained. That is, a wireless communication system in accordance with a first aspect of the present invention can obtain appropriate communication quality in all of the permitted mobile stations connected to the second base station. Further, by setting the target level to a value corresponding to the lowest limit of the quality required for a plurality of permitted mobile stations, the transmission power of the second base station can be reduced as much as possible while still providing appropriate communication quality for the plurality of permitted mobile stations.

EXPLANATION OF REFERENCE

1 MACRO GATEWAY APPARATUS
2 FEMTO GATEWAY APPARATUS
3 MACRO BASE STATION
4 FEMTO BASE STATION
5 MACROCELL
6 FEMTOCELL
7-1 to 7-4 MOBILE STATIONS
10 NETWORK
30 ANTENNA
31 WIRELESS TRANSMISSION/RECEPTION UNIT
32 RECEPTION DATA PROCESSING UNIT
33 TRANSMISSION DATA PROCESSING UNIT
34 WIRED TRANSMISSION/RECEPTION UNIT
35 WIRELESS NETWORK CONTROL UNIT
36 MOBILE-STATION MODE RECEIVING UNIT
37 WIRELESS NETWORK CONTROL DATA SETTING UNIT

BEST MODE FOR CARRYING OUT THE INVENTION

Next, exemplary embodiments of the present invention are explained with reference to the drawings.

Figure 1:
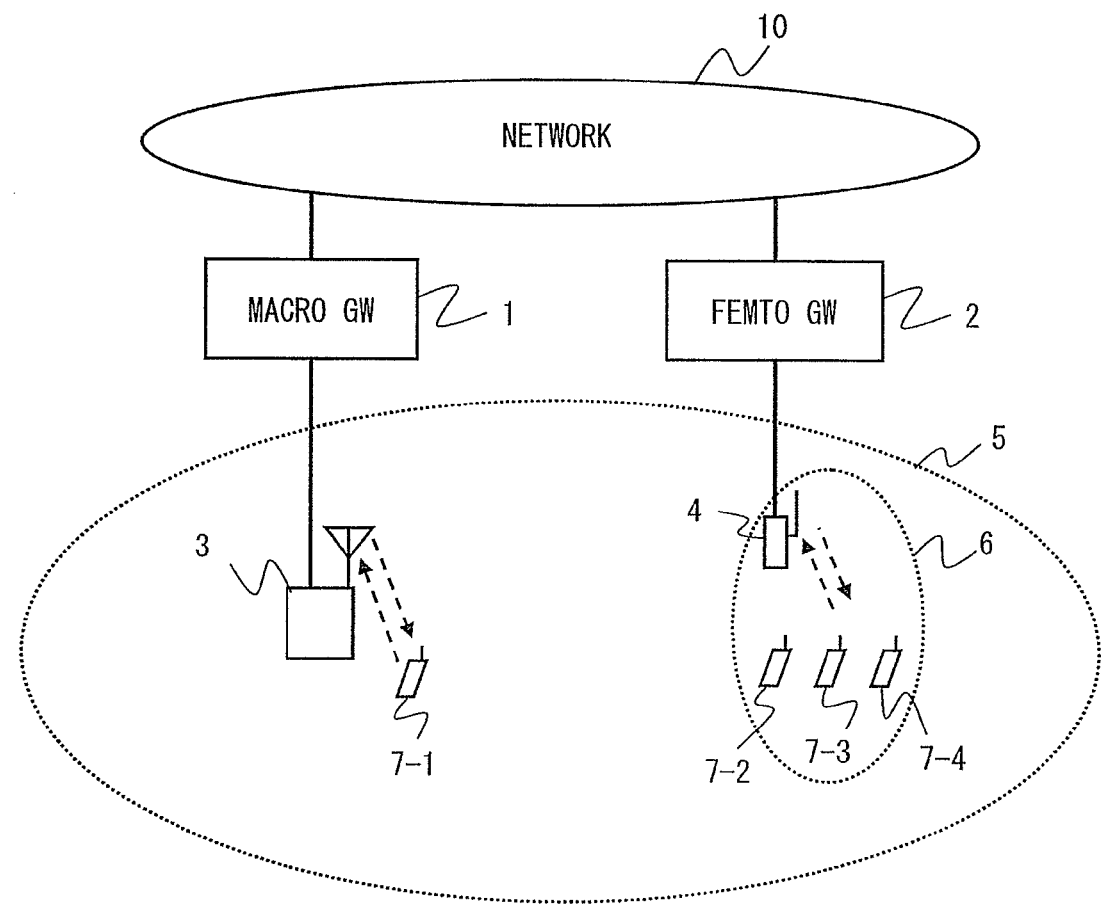
FIG. 1 shows a system configuration in accordance with first to third exemplary embodiments of the present invention.

FIG. 1 is a configuration diagram of a wireless communication system in accordance with first to third exemplary embodiments of the present invention. This wireless communication system includes macro gateway apparatus 1, femto gateway apparatus 2, a macro base station 3, a femto base station 4, a macrocell 5, a femtocell 6, and mobile stations 7-1 to 7-4.

The macro base station 3 and the femto base station 4 form the macrocell 5 and the femtocell 6 respectively. The macro base station 3 communicates with the mobile station 7-1, and the femto base station 4 communicates with the mobile stations 7-2 to 7-4. The number of cells formed by each of the macro base station 3 and the femto base station 4 may be more than one. However, each of the macro base station 3 and the femto base station 4 forms one cell in this exemplary embodiment.

The macro gateway apparatus 1 is connected to the macro base station 3. The femto gateway apparatus 2 is connected to the femto base station 4. Further, these gateway apparatuses 1 and 2, which are also connected to a network 10 in a higher layer, control communication and perform information transmission between the higher network 10 and the mobile stations 7-1 to 7-4 located within the cell of a subordinate base station.

The wireless communication system in accordance with this exemplary embodiment may also include a number of other macro base stations and femto base stations, macrocells and femtocells corresponding to those base stations, and mobile stations in addition to those shown in FIG. 1. However, their illustration is omitted in the figure.

All of the mobile stations 7-1 to 7-4 are permitted to connect to the macro base station 3. Meanwhile, the identifiers of only the mobile stations 7-2 to 7-4 are registered in the femto base station 4, and only the mobile stations 7-2 to 7-4 are thereby permitted to connect to the femto base station 4 as a pre-registered mobile station.

To permit the connection only to specified mobile stations, the femto base station 4 transmits cell identification number information by using a common control channel, and also transmits connection restriction information indicating that it is a cell that permits the connection only to specified mobile stations. Meanwhile, each of the mobile stations 7-2 to 7-4 retains the cell identification number information of a cell for which the connection is permitted. Further, when connection restriction information and cell identification number are being transmitted in the femtocell 6, if the transmitted cell identification number matches with the retained cell identification number, the mobile stations 7-2 to 7-4 connect to the cell as a cell selection candidate.

The macro base station 3 and the femto base station 4 communicate with a mobile station by using the same radio frequency. Further, the macro base station 3 transmits a pilot signal with a predetermined constant transmission power on the CPICH (Common Pilot Channel) of the downlink line in the macro cell 5. Meanwhile, the femto base station 4 autonomously sets the transmission power Ptx of a common pilot signal, and transmits a common pilot signal with the transmission power Ptx on the CPICH in the femtocell 6. The setting method of the transmission power Ptx by the femto base station 4 is explained with each exemplary embodiment described later.

Further, each of the macro base station 3 and the femto base station 4 transmits downlink data to a mobile station by using a downlink data channel, and receives uplink data from a mobile station by using an uplink data channel.

Assume that the maximum value Ptx_total_max of the total amount of transmission power of all channels transmitted by the femto base station 4 in the femtocell 6 is expressed as "Min(Ptx+Dtotal, Ptx_total_limit) [dBm]". Note that Min (Ptx+Dtotal, Ptx_total_limit) indicates a smaller one of Ptx+Dtotal and Ptx_total_limit. Further, Dtotal is a predetermined fixed value (e.g., 10 dB). Ptx_total_limit is the transmission power capacity (upper limit of transmission power) of the femto base station 4. The femto base station 4 controls the transmission power of a downlink data channel such that the total amount of transmission power remains at or below the above-described maximum value Ptx_total_max. In this way, the ratio of the transmission power of the common pilot channel to the total transmission power of the femto base station 4 does not become smaller than a predetermined value. Further, by reducing Ptx, the total amount of transmission power of the femto base station 4 is also reduced, thus making it possible to suppress interference with a mobile station connected to other base stations.

Note that although this exemplary embodiment adopts a FDD (Frequency Division Duplex) mode in which different radio frequencies are used in the uplink and downlink lines, the present invention can be also practiced in a completely similar manner in embodiments using a TDD (Time Division Duplex) mode in which the same radio frequency is used in both the uplink and downlink lines in a time-division manner.

First Exemplary Embodiment

A wireless communication system in accordance with this exemplary embodiment may adopt any mode as the communication mode between a base station and a mobile station. However, a CDMA mode is adopted as the wireless access mode in a first exemplary embodiment, and each of the macro base station 3, the femto base station 4, and the mobile stations 7-1 to 7-4 spreads a transmission signal over a predetermined radio frequency band to transmit information. Further, the macro gateway apparatus 1 in accordance with the first exemplary embodiment is equipped with an RNC (Radio Network Controller) function. In this way, the macro gateway apparatus 1 notifies the macro base station 3 of a predetermined radio frequency, a transmission power of a common pilot signal, and the like of the macrocell 5.

Figure 2:
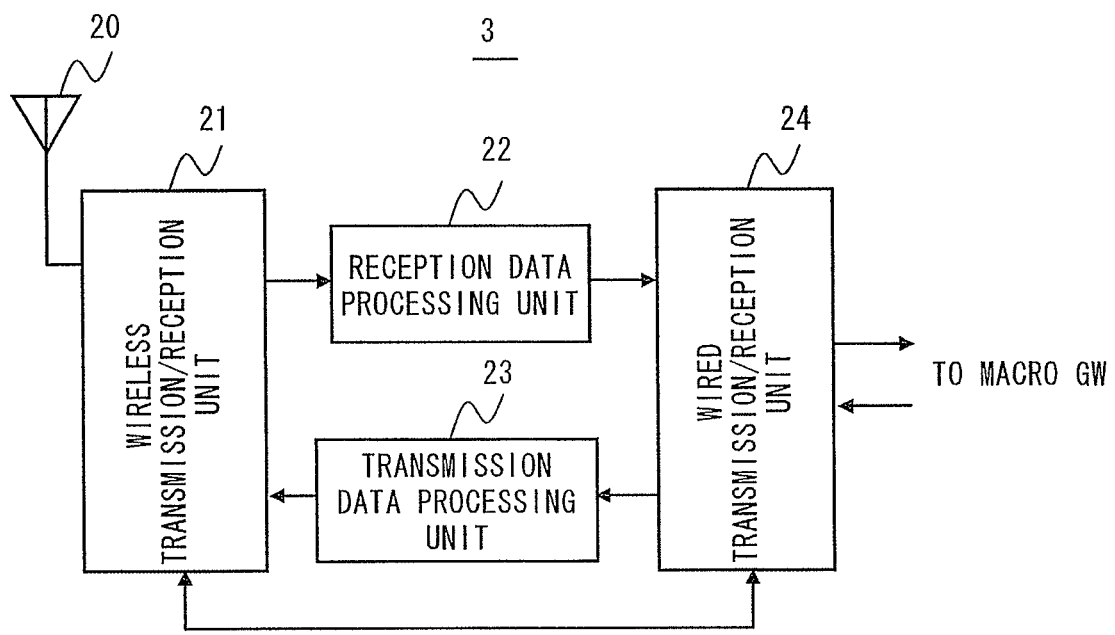
FIG. 2 shows a configuration of a macro base station in accordance with first and second exemplary embodiments of the present invention.

FIG. 2 shows an example of a configuration of a macro base station 3. Referring to FIG. 2, the macro base station 3 in accordance with this exemplary embodiment includes an antenna 20, a wireless transmission/reception unit 21, a reception data processing unit 22, a transmission data processing unit 23, and a wired transmission/reception unit 24.

The wireless transmission/reception unit 21 receives a notification of the radio frequency, the transmission power of a common pilot signal, and the like of the formed cell from the macro gateway apparatus 1 through the wired transmission/reception unit 24, and transmits a common pilot signal based on the notification. Further, the wireless transmission/reception unit 21 receives downlink data from the macro gateway apparatus 1 through the wired transmission/reception unit 24 and the transmission data processing unit 23, and transmits the received downlink data through the antenna 20 toward the mobile station 7-1. Further, the wireless transmission/reception unit 21 receives uplink data from the mobile station 7-1 through the antenna 20, and transmits the received uplink data to the macro gateway apparatus 1 through the reception data processing unit 22 and the wired transmission/reception unit 24.

Figure 3:
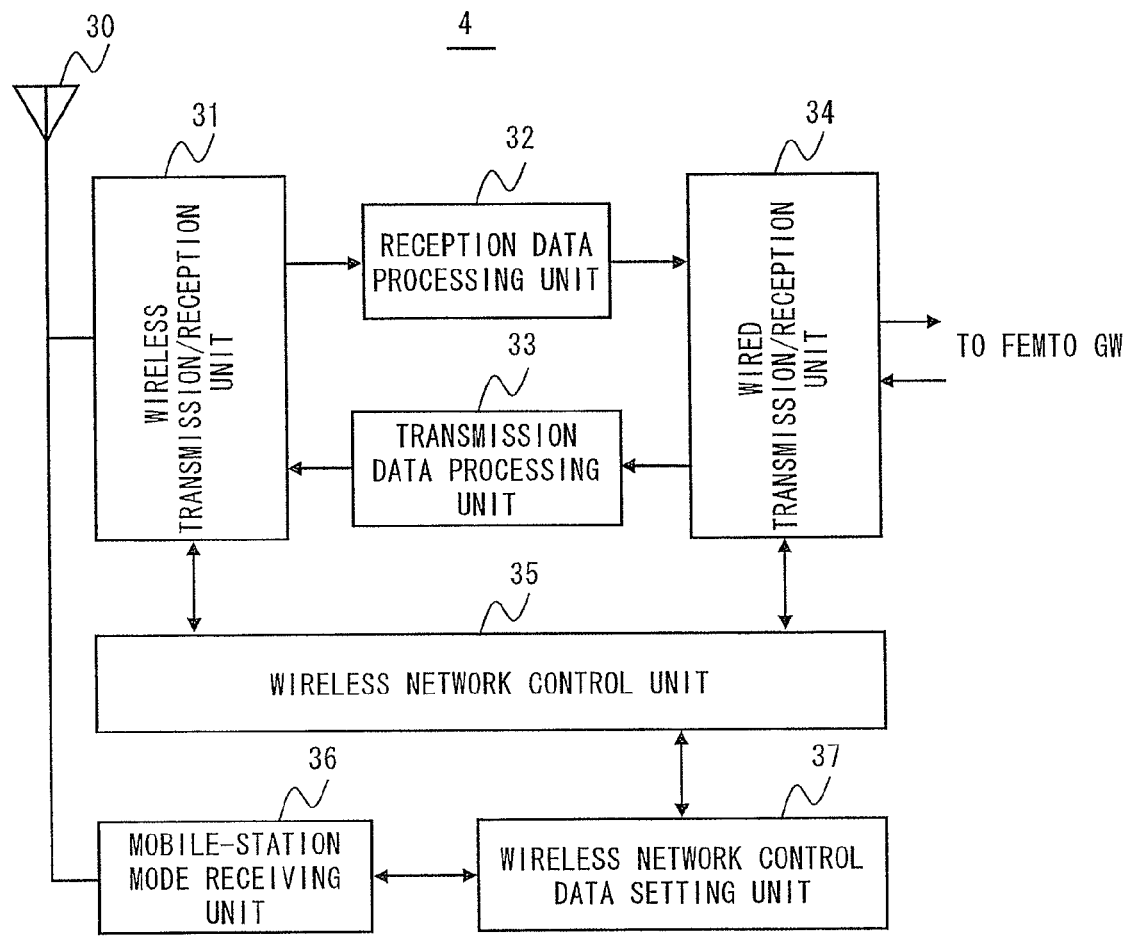
FIG. 3 shows a configuration of a femto base station in accordance with first to third exemplary embodiments of the present invention.

FIG. 3 shows an example of a configuration of a femto base station 4. Referring to FIG. 3, the femto base station 4 in accordance with this exemplary embodiment includes an antenna 30, a wireless transmission/reception unit 31, a reception data processing unit 32, a transmission data processing unit 33, a wired transmission/reception unit 34, a wireless network control unit 35, a mobile-station mode receiving unit 36, and a wireless network control data setting unit 37.

The mobile-station mode receiving unit 36 measures the reception level of a common pilot signal that is being transmitted in the macrocell 5 through the antenna 30. The wireless network control data setting unit 37 determines the transmission power of a common pilot signal by the femto base station 4. To that end, the wireless network control data setting unit 37 sends a measurement instruction for the mobile stations 7-2 to 7-4 to the wireless network control unit 35, and receives its measurement report from the wireless network control unit 35. Further, the wireless network control data setting unit 37 also receives a notification of the reception level of a common pilot signal that is being transmitted by the macro base station 3 in the macrocell 5 and measured by the mobile-station mode receiving unit 36. The wireless network control data setting unit 37 supplies the determined transmission power of a common pilot signal to the wireless network control unit 35.

The wireless network control unit 35, which has a function of an RNC, transmits the above-described measurement instruction for the mobile stations 7-2 to 7-4 and receives the measurement report from the mobile stations 7-2 to 7-4 through the wireless transmission/reception unit 31 and the antenna 30, and notifies the wireless transmission/reception unit 31 of the radio frequency to be used and the transmission power of a common pilot signal. Then, the wireless transmission/reception unit 31 receives the notification of the radio frequency and the transmission power of a common pilot signal from the wireless network control unit 35, and transmits a common pilot signal based on the notification. Further, similarly to the wireless transmission/reception unit 21 of the macro base station, the wireless transmission/reception unit 31 transmits/receives downlink and uplink data.

Figure 4:
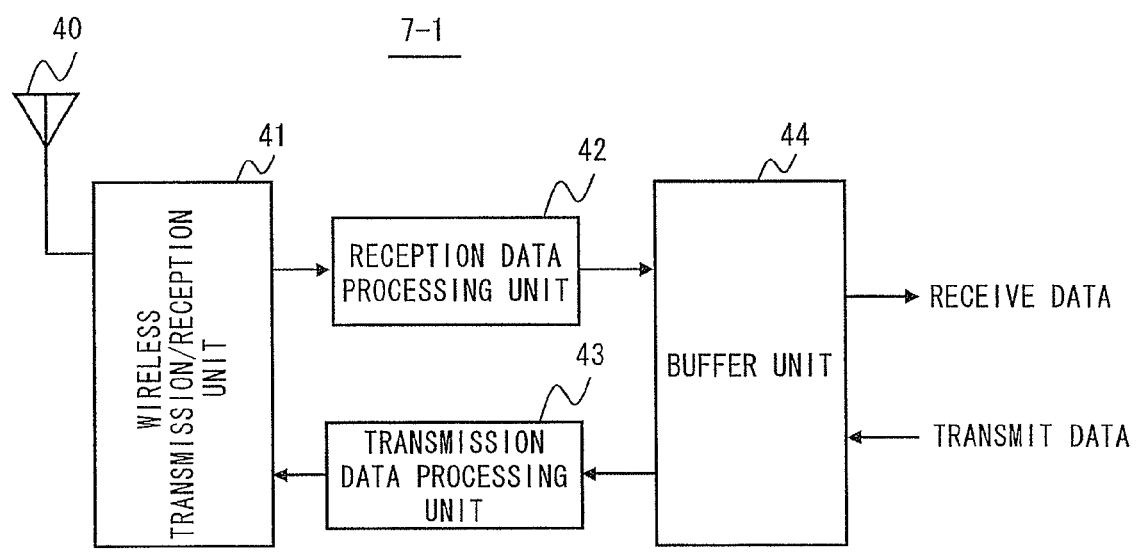
FIG. 4 shows a configuration of a base station in accordance with first to third exemplary embodiments of the present invention.

FIG. 4 shows an example of a configuration of a mobile station 7-1. Note that each of the other mobile stations 7-2 to 7-4 may have a similar configuration. Referring to FIG. 4, the mobile station 7-1 in accordance with this exemplary embodiment includes an antenna 40, a wireless transmission/reception unit 41, a reception data processing unit 42, a transmission data processing unit 43, and a buffer unit 44.

The wireless transmission/reception unit 41 receives downlink data through the antenna 40, and transmits the received downlink data to the buffer unit 44 through the reception data processing unit 42. The downlink data stored in the buffer unit 44 is read out and used according to its purpose. Further, the wireless transmission/reception unit 41 receives uplink data stored in the buffer unit 44 through the transmission data processing unit 43, and transmits the received uplink data through the antenna 40 toward a base station (macro base station 3 or femto base station 4).

Figure 5:
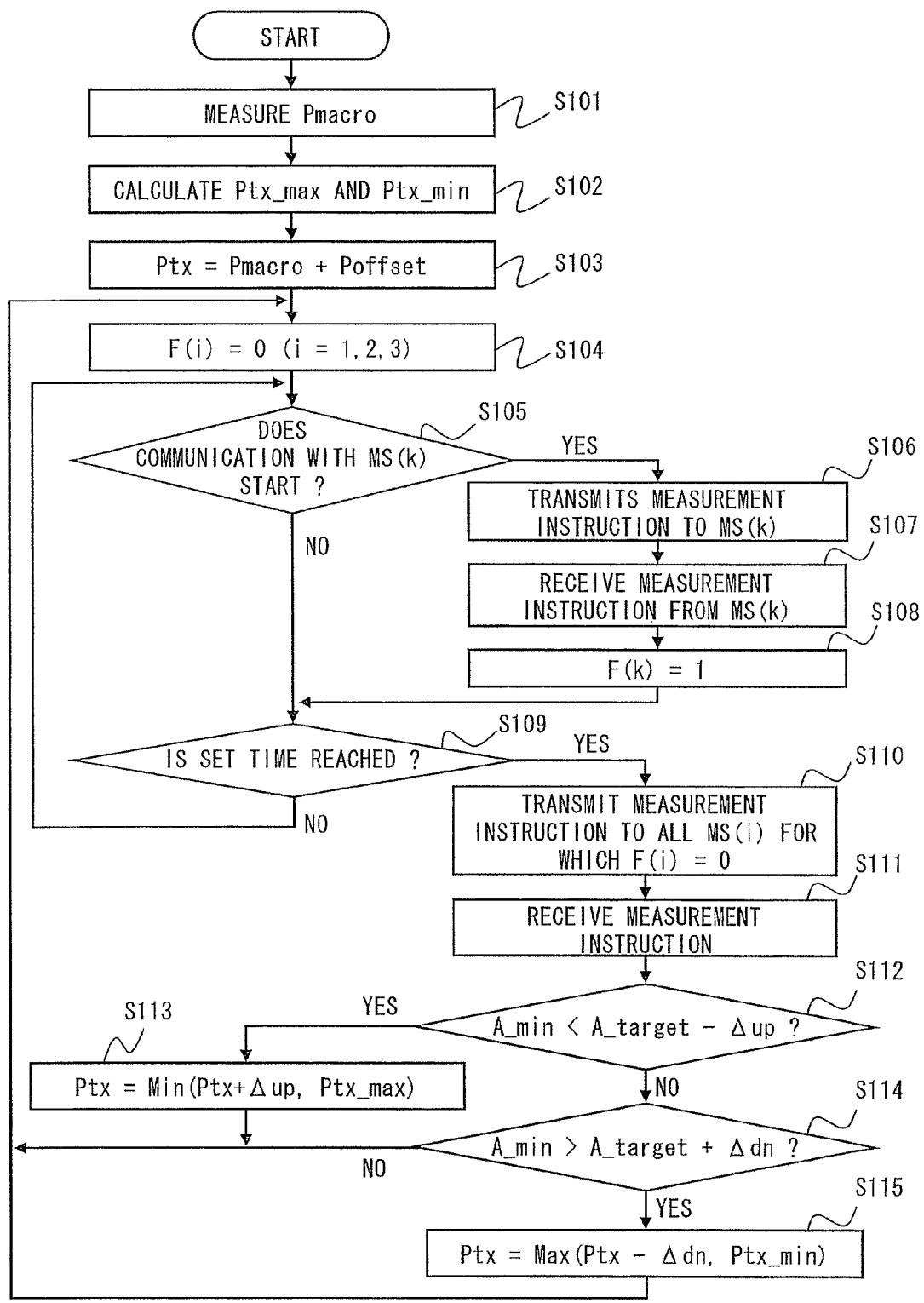
FIG. 5 shows setting procedure of the transmission power of a common pilot signal in accordance with first exemplary embodiment of the present invention.

FIG. 5 is a flowchart showing an example of procedure through which the femto base station 4 in accordance with this exemplary embodiment sets the transmission power Ptx of a common pilot signal.

Referring to FIG. 5, the femto base station 4 measures the received power Pmacro of a common pilot signal of the macro base station 3 (step S101). When the femto base station 4 performs measurement of Pmacro, it suspends the transmission of all radio signals and enters a mobile-station mode in which the femto base station 4 receives a common pilot signal transmitted from the macro base station 3. Note that in this flowchart, each symbol such as Pmacro represents a decibel value.

In a step S102, by using Pmacro as a reference, the maximum value Ptx_max and the minimum value Ptx_min of Ptx are determined as "Pmacro+Poffset_max" and "Pmacro+Poffset_min" respectively. However, the upper-limit value and the lower-limit value are specified for Ptx in advance, and the system is configured so that Ptx_max and Ptx_min do not exceed the upper-limit value and the lower-limit value respectively. Further, while Ptx is defined as "Ptx=Pmacro+Poffset", the transmission of the transmission power of a common pilot signal is started (step S103). In steps S102 and S103, each of Poffset, Poffset_max, and Poffset_min is a constant value satisfying a relation "Poffset_max>Poffset>Poffset_min".

By having the femto base station 4 start the transmission of a common pilot signal, the communication between the femto base station 4 and the mobile stations 7-2 to 7-4 becomes possible. As a result, the mobile stations 7-2 to 7-4 can also measure the reception quality level of a common pilot signal transmitted from the femto base station 4. Then, in a step S104, for each of the mobile stations 7-2 to 7-4, its measurement-carried-out flag F(i) is set to zero. Note that i is 1, 2 and 3, and indicates each of the mobile stations 7-2 to 7-4.

Then, when a communication request occurs for any one mobile station MS(k) of the mobile stations 7-2 to 7-4 and communication with the femto base station 4 is thereby performed, a measurement instruction is transmitted to the mobile station MS(k) (steps S105 and S106). The mobile station MS(k) measures the reception quality level of a common pilot signal transmitted by the femto base station 4 in response to the instruction from the femto base station 4, and transmits its measurement report to the femto base station 4. Then, the femto base station 4 receives the measurement report from the mobile station MS(k), and sets a flag F(k) corresponding to the mobile station MS(k) that has completed the measurement to 1 (steps S107 and S108).

Note that if the femto base station 4 starts communication with a mobile station 7-2, for example, and transmits a measurement instruction of the step S106 to the mobile station 7-2 immediately after the start of communication, the mobile station 7-2 measures the reception quality level of a common pilot signal during the communication with the femto base station 4. Further, instead of transmitting a measurement instruction to the mobile station 7-2 immediately after the start of the communication with the mobile station 7-2, the femto base station 4 may transmits a measurement instruction to the mobile station 7-2 after the completion of the communication by using the completion as a trigger, and then the mobile station 7-2 may carry out the measurement upon the reception of the instruction.

The femto base station 4, which includes a clock (not shown) within it, repeats steps S105 to S109 until a predetermined set time is reached. When the predetermined set time has been reached in a step S109, the femto base station 4 transmits a measurement instruction to all the mobile stations MS(i) that have not reported a measurement yet, i.e., the mobile stations MS(i) for which F(i)=0, and receives a measurement report from these mobile stations MS(i) (steps S110 and S111). Note that a time that is a certain time interval (e.g., one hour) after the time at which the transmission of a common pilot signal is started in the step S103 is set as the set time.

Then, in a step S112, the femto base station 4 determines whether or not the lowest reception quality level A_min among reception quality levels measured by the three mobile stations 7-2 to 7-4 is smaller than a value that is smaller than a predetermined target level A_target by a predetermined step width Δup, i.e., A_target-Δup. If the determination result in the step S112 is Yes, the femto base station 4 increases the Ptx at that moment by Δup within a range that does not exceed Ptx_max (step S113).

On the other hand, if the determination result in the step S112 is No, it is determined whether or not the lowest reception quality level A_min is larger than a value that is larger than a predetermined target level A_target by a predetermined step width Δdn, i.e., A_target+Δdn (step S114). If the determination result in the step S114 is Yes, the femto base station 4 decreases the Ptx at that moment by Δdn within a range that does not fall below Ptx_min (step S115). Then, the procedure returns to the step S104, and the femto base station 4 repeats the processes in the steps S104 to S115.

By repeating processes shown in FIG. 5, the minimum reception quality level A_min among the pre-registered mobile stations (mobile stations 7-2 to 7-4) gradually gets closer to the predetermined target level A_target.

Note that in the example shown in FIG. 5, Ptx is increased/decreased by a step width of Δup/Δdn. However, instead of increasing/decreasing by a step width of Δup/Δdn, an updated value of Ptx may be obtained by adding the difference between the target level A_target and the lowest reception quality level A_min to the value of the Ptx at that moment. In this case, the equation expressing an updated value of Ptx is written, for example, as follows.

$$Ptx=\text{Median}(Ptx+A\_target-Amin, Ptx\_max, Ptx\_min)$$

Note that the function Median (A, B, C) is a function to obtain the median among the three values A, B and C that are designated as arguments. As described above, A_target is the target value of the reception quality level. Further, Amin is the lowest value among three reception quality levels that are obtained by measuring a common pilot signal transmitted from the femto base station 4 by three mobile stations 7-2 to 7-4.

Second Exemplary Embodiment

Figure 6:
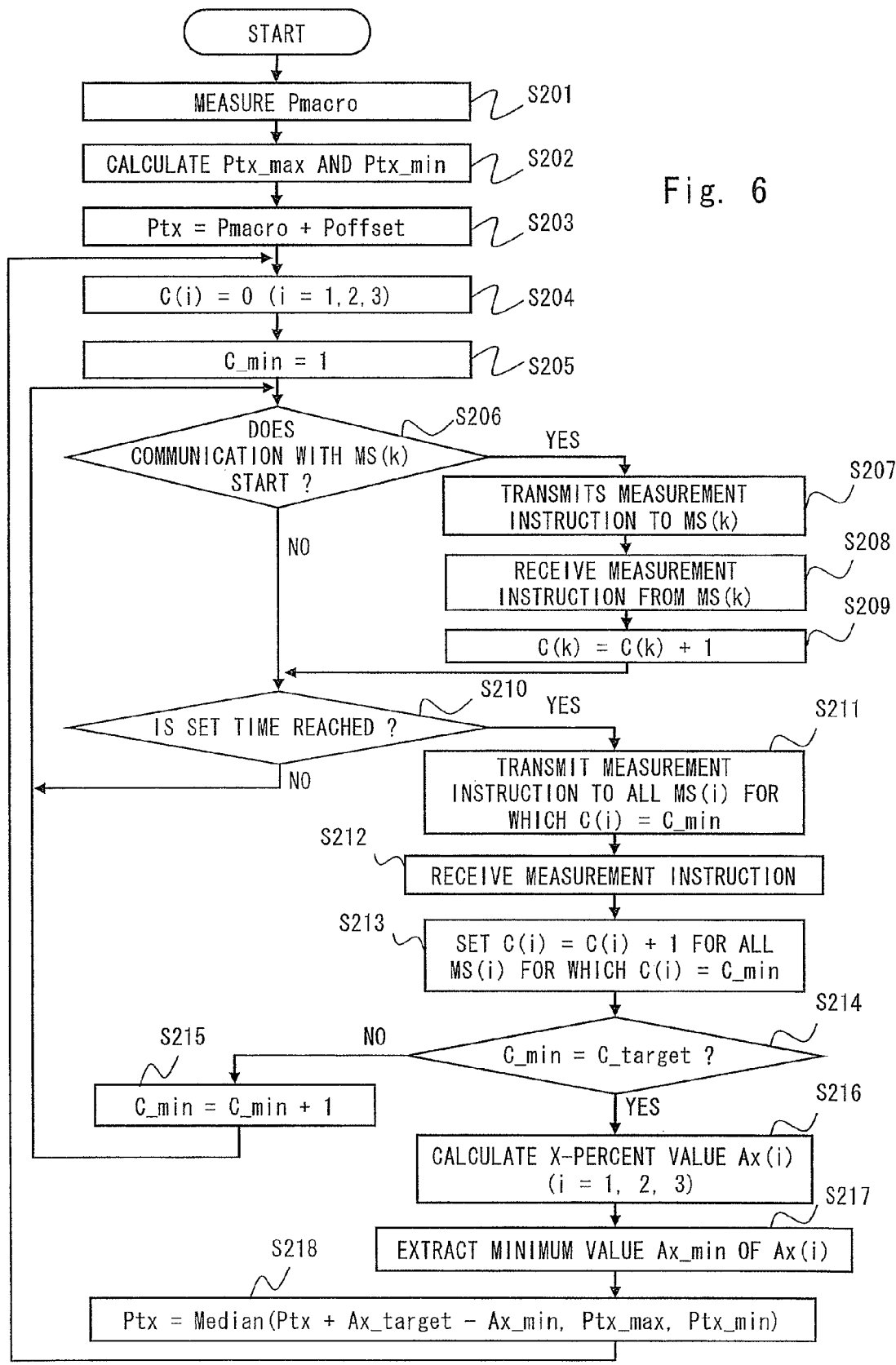
FIG. 6 shows setting procedure of the transmission power of a common pilot signal in accordance with second and third exemplary embodiments of the present invention.

In a second exemplary embodiment, the femto base station 4 sets Ptx through procedure shown in a flowchart of FIG. 6. The configuration of the macro base station 3, the femto base station 4, and the mobile stations 7-1 to 7-4 may be the same as that of the first exemplary embodiment except that the setting procedure of Ptx by the femto base station 4 is different.

Referring to FIG. 6, steps S201 to S203 are similar to the steps S101 to S103 shown in FIG. 5 of the first exemplary embodiment. Further, in a step S204, for each of the mobile stations 7-2 to 7-4, the femto base station 4 sets its measurement-carry-out flag C(i) to zero. Note that i is 1, 2 and 3, and indicates each of the mobile stations 7-2 to 7-4. Further, C_min is set to 1 (step S205).

Then, similarly to the first exemplary embodiment, when a communication request occurs for any one mobile station MS(k) of the mobile stations 7-2 to 7-4, the femto base station 4 transmits a measurement instruction for the reception quality level of a pilot signal to the mobile station MS(k), receives a measurement report from the mobile station MS(k), and adds 1 to the flag C(i) (steps S206 to S209).

The femto base station 4 repeats steps S206 to S210 until a predetermined set time is reached. When it is determined that the predetermined set time has been reached in a step S210, the femto base station 4 transmits an additional measurement instruction(s) to all the mobile stations MS(i) for which the number of measurement reports is small, i.e., the mobile stations MS(i) for which C(i)<C_min. Then, the femto base station 4 receives an additional measurement report(s) from these mobile stations MS(i), and adds 1 to the flag C(i) (steps S211 to S213).

Then, in a step S214, if it is determined that C_min is not equal to a predetermined sample acquisition target value C_target (No in step S214), the femto base station 4 adds 1 to C_min and then repeats processes in and after the step S206. On the other hand, in a step S214, if C_min is determined to be equal to the predetermined sample acquisition target value C_target (Yes in step S214), the femto base station 4 obtains the X-percent value Ax(i) of the reception quality level for each mobile station MS(i) in a step S216. Note that X is a numerical value no less than 0 and no more than 100. For example, if X is 10 and the number of measurement samples is 100, the femto base station 4 obtains the value of 10th lowest reception quality level and defines it as Ax(i). Further, the femto base station 4 obtains the lowest value Ax_min among a plurality of Ax(i) (step S217), and obtains an updated value of Ptx by the following equation (step S218).

$$Ptx=\text{Median}(Ptx+Ax\_target-Ax\_min, Ptx\_max, Ptx\_min)$$

Note that Ax_target is a predetermined target level for X-percent value Ax(i). Then, when the femto base station 4 has finished the step S218, it repeats processes in and after the step S204.

By repeating processes shown in FIG. 6, it is possible to keep the lowest value Ax_min of the X-percent value of the reception quality level among the pre-registered mobile stations (mobile stations 7-2 to 7-4) at a value roughly equal to the predetermined target level Ax_target.

Note that FIG. 6 shows an example in which an updated value of Ptx is obtained by adding the difference between the target level Ax_target and the lowest value Ax_min of the X-percent value to the Ptx at that moment. However, instead of this method, an updated value of Ptx may be obtained by increasing/decreasing by a step width of Δup/Δdn as in the case of the first exemplary embodiment.

In accordance with the setting procedure of Ptx shown in this exemplary embodiment, the possibility that the reception quality level of a pilot signal transmitted by the femto base station 4 falls below the target level in any of the pre-registered mobile stations 7-2 to 7-4 including a mobile station having the lowest communication quality can be reduced to or below X percent. That is, since each of the mobile stations 7-2 to 7-4 performs the measurement of the reception quality level of a pilot signal and reporting of its measurement result a plurality of times, it is possible to provide invariant communication quality to all the pre-registered mobile stations 7-2 to 7-4 even when the frequency of communication is different from one mobile station to another.

Third Exemplary Embodiment

Although a WCDMA mode is adopted as a communication mode between a base station and a mobile station in the first and second exemplary embodiments, a single carrier FDMA (Frequency Division Multiple Access) mode and an OFDM (Orthogonal Frequency Division Multiplexing) mode are adopted on the uplink and downlink lines respectively in a third exemplary embodiment. Further, the radio frequency band is divided into a plurality of PRBs (Physical Resource Blocks), and a scheduler provided in the macro base station 3 and femto base station 4 performs the assignment of the PRBs. Each of the macro base station 3 and the femto base station 4 performs data communication with a mobile station by using an assigned PRB.

Although the macro gateway apparatus 1 in accordance with the first exemplary embodiment is equipped with the RNC (Radio Network Controller) function, the macro gateway apparatus 1 in accordance with the third exemplary embodiment does not have the RNC function. Instead, the macro base station 3 is equipped with the RNC function.

Figure 7:
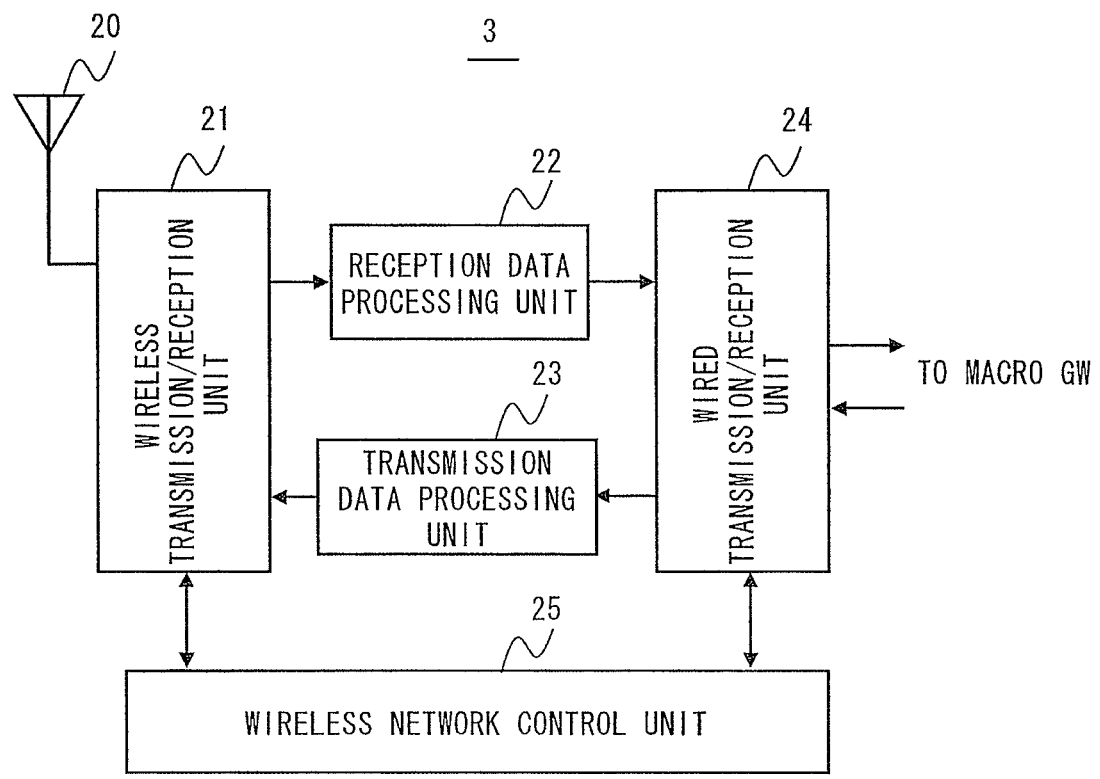
FIG. 7 shows a configuration of a macro base station in accordance with third exemplary embodiment of the present invention.
Figure 8:
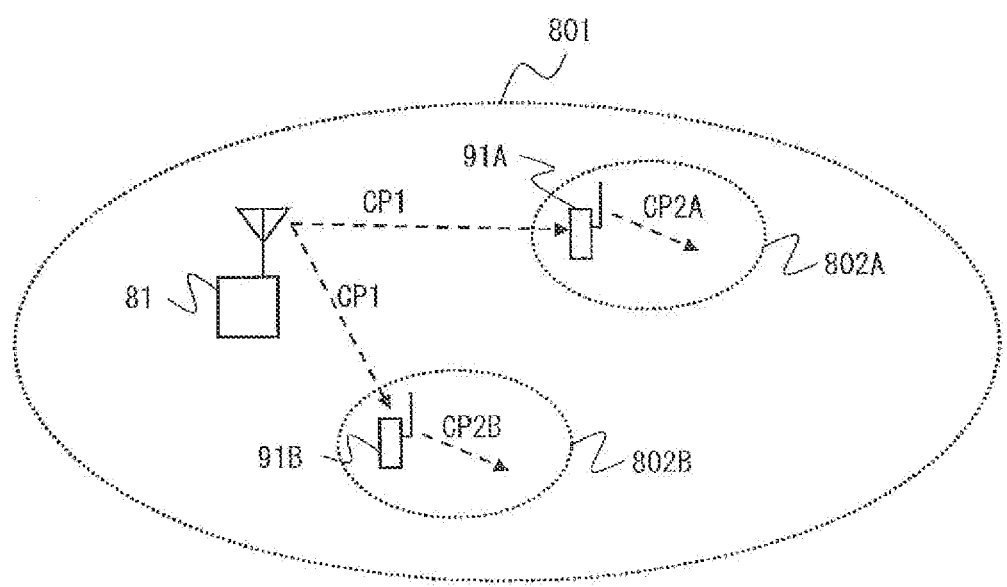
FIG. 8 is a system configuration diagram for explaining related art.
Figure 9A:
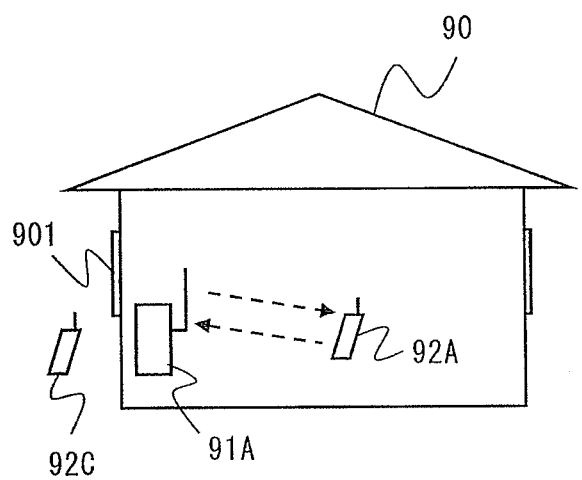
FIG. 9A shows locations of a femto base station and a mobile station inside a building.
Figure 9B:
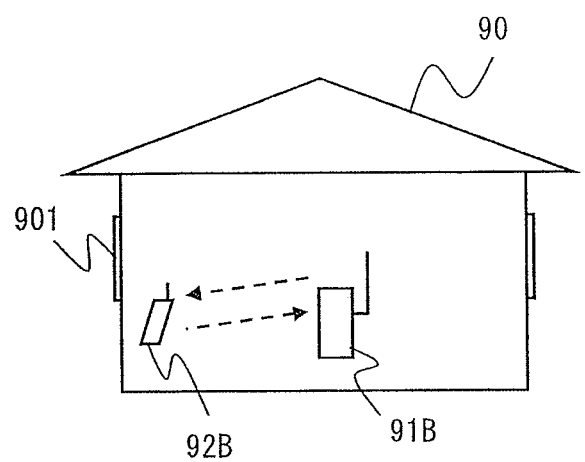
FIG. 9B shows locations of a femto base station and a mobile station inside a building.

FIG. 7 shows an example of a configuration of a macro base station 3 in accordance with a third exemplary embodiment. Referring to FIG. 7, the macro base station 3 in accordance with this exemplary embodiment includes a wireless network control unit 25. The wireless network control unit 25 retains control parameters to be used in each cell, such as a frequency channel and a transmission power value of a pilot signal, and notifies these parameters to the wireless transmission/reception unit 21. The wireless transmission/reception unit 21 in FIG. 7 uses the control parameters, which are not notified from the macro gateway apparatus 1 but are notified from the wireless network control unit 25, to perform wireless communication with a mobile station. Note that the other components in FIG. 7 are similar to those of the macro base station 3 in accordance with the first exemplary embodiment explained with reference to FIG. 2 except for a difference in the modulation mode used in the wireless transmission/reception unit 21. Further, the configuration of the femto base station 4 and the mobile stations 7-1 to 7-4, and the determination procedure of the transmission power of a common pilot signal by the femto base station 4 in accordance with this exemplary embodiment may be the same as those in either one of the above-described first and second exemplary embodiment.

Further, in the above-described first to third exemplary embodiments, a plurality of mobile stations 7-2 to 7-4 measure the reception quality level of a common pilot signal transmitted by the femto base station 4. Then, the femto base station 4 adjusts the transmission power of the pilot signal so that the lowest reception quality level among a plurality of measurement results exceeds the target level. If a transmission power Ptx is set according to the measurement result of the reception quality of a common pilot signal by each of a plurality of mobile stations 7-2 to 7-4, there is a possibility that when one of mobile stations located near the femto base station 4 reports a measurement, the transmission power Ptx could become smaller and the communication quality could deteriorate in a mobile station located far from the femto base station after the reporting. However, in accordance with the configuration of the first to third exemplary embodiments, even a mobile station having the lowest communication quality level among the plurality of pre-registered mobile stations 7-2 to 7-4 can obtains appropriate communication quality. That is, the configuration of the first to third exemplary embodiments is effective in that appropriate communication quality can be obtained in all the pre-registered mobile stations 7-2 to 7-4 that are located within the femtocell 6 and connected to the femto base station 4.

Further, in the determination procedure of the transmission power of a pilot signal performed by the femto base station 4 described in the first to third exemplary embodiments, the transmission power Ptx is updated so that the reception quality level, of a common pilot signal transmitted from the femto base station 4, measured in the mobile stations 7-2 to 7-4 gradually gets closer to the target level. The update control procedure of transmission power like this is effective in that by setting the target level to a value corresponding to the lowest limit of the quality required for the mobile stations 7-2 to 7-4, appropriate communication quality can be provided for the mobile stations 7-2 to 7-4 registered in the femto base station 4 while reducing the transmission power of the femto base station 4 as much as possible.

Other Exemplary Embodiments

Additional embodiments modified from the above-described first to third exemplary embodiments are listed hereinafter. In the first to third exemplary embodiments, the reception quality level of the common pilot signal to be measured by the mobile stations 7-2 to 7-4 may be, for example, the received power of the common pilot signal, the reception SIR (Signal to Interference Ratio) of the common pilot signal, the BER (Bit Error Rate) of the common pilot signal, or the combination thereof. Further, any other parameters with which the reception quality of a pilot signal can be evaluated may be also used.

Further, in the determination procedure of the transmission power of a common pilot signal performed by the femto base station 4 described in the first to third exemplary embodiments, the maximum value Ptx_max and the minimum value Ptx_max of the transmission power of a common pilot signal by the femto base station 4 are determined according to the reception level Pmacro of the common pilot signal transmitted from the macro base station 3. In accordance with the configuration like this, when the signal strength of a common pilot signal transmitted from the macro base station 3 is very weak in the vicinity of the femto base station 4, the maximum value Ptx_max of the pilot signal of the femto base station 4 can be lowered according to this weak strength. Therefore, it can provide such an advantageous effect that the interference of the femto base station 4 to a mobile station that is located near the femto base station 4 but is connected to the macro base station 3 instead of the femto base station 4 can be suppressed.

However, both of the maximum value Ptx_max and the minimum value Ptx_max do not have to be necessarily determined by using Pmacro as a reference. For example, only the maximum value Ptx_max may be determined according to Pmacro while the minimum value Ptx_max may be fixed at a predetermined constant value.

Further, in the first to third exemplary embodiments, examples in which the femto base station 4 determines the transmission power Ptx of a common pilot signal by using the measurement result of the received power Pmacro of a pilot signal transmitted from the macro base station 3 are shown. However, the received power Pmacro of a pilot signal transmitted from the macro base station 3 is merely one of the parameters indicating the reception quality of a signal transmitted from the macro base station 3. For example, instead of or in addition of using the received power Pmacro of a common pilot signal, the femto base station 4 may use the reception SIR (Signal to Interference Ratio) of a common pilot signal. For example, when the reception SIR (hereinafter called "SIRmacro") of a common pilot signal transmitted from the macro base station 3 is used, SIRmacro should be measured in the step S101 of FIG. 5 and the step S201 of FIG. 6. Further, in the step S102 of FIG. 5 and the step S202 of FIG. 6, Ptx_max and Ptx_min should be calculated by "SIRmacro+Poffset_max2" and "SIRmacro+Poffset_min2" respectively. Further, in the step S103 of FIG. 5 and the step S203 of FIG. 6, Ptx should be calculated from "SIRmacro+Poffset2". Note that each of Poffset_max2, Poffset_min2, and Poffset2 is a constant value satisfying a relation "Poffset_max2>Poffset2>Poffset_min2".

Further, the determination procedure of the transmission power of a common pilot signal performed by the femto base station 4 described in the first to third exemplary embodiments can be implemented by executing a program for base-station control in a computer such as a microprocessor. In the case of the first exemplary embodiment, for example, the measurement of the reception level of a pilot signal transmitted from the femto base station 4 may be carried out by the mobile-station mode receiving unit 36 based on the control of a computer executing a base-station control program. Then, an initial value of the transmission power Ptx of its own pilot signal may be determined based on the obtained measurement result of the reception level of the pilot signal. Further, after the obtained initial value may be set in the wireless transmission/reception unit 31, the communication with the mobile stations 7-2 to 7-4 may be performed. Furthermore, based on control by the computer, the mobile stations 7-2 to 7-4 may be requested to measure the reception level of a pilot signal transmitted by the femto base station 4. Then, the transmission power of a pilot signal may be adjusted by using a measurement report(s) received from the mobile stations 7-2 to 7-4, and the adjusted transmission power Ptx may be set in the wireless transmission/reception unit 31.

Further, the present invention is not limited to the above-described exemplary embodiments, and needless to say, various modifications can be made within the limits that do not depart from the spirit of the present invention described above.

This application is based upon and claims the benefit of priority from Japanese patent application No. 2007-263050, filed on Oct. 9, 2007, the disclosure of which is incorporated herein in its entirety by reference.

INDUSTRIAL APPLICABILITY

The present invention is capable to be applied to a wireless communication system, in particular a wireless communication system, a wireless communication method, and a base station in which in which at least one of the base stations autonomously sets the transmission power of a common pilot signal.

What is claimed is:
1. A wireless communication system comprising:
a first base station; and
at least one mobile station that is pre-registered with the first base station to connect to and communicate with the first base station, and measures a reception quality level of a first signal from the first base station and reports a measurement result of the reception quality level to the first base station,
wherein the first base station adjusts transmission power of the first base station based on a plurality of reception quality levels of the first signal measured by the at least one mobile station so that a lowest level from among the plurality of reception quality levels gets closer to a predetermined target level, wherein
if the lowest level from among the plurality of reception quality levels is smaller than the predetermined target level, the first base station increases the transmission power, and if the lowest level from among the plurality of reception quality levels is larger than the predetermined target level, the first base station decreases the transmission power.

2. The wireless communication system according to claim 1, wherein the adjustment, by the first base station, includes adding a difference between the target level and the lowest reception quality level to a current value of the transmission power.

3. The wireless communication system according to claim 1, wherein
each of said at least one mobile station performs the measurement and the reporting a plurality of times,
the first base station obtains an X-percent value (where X is a value no less than 0 and no larger than 100) of a reception quality level of the first signal, and
the adjustment, by the first base station, includes adjusting the transmission power so that a lowest value among a plurality of X-percent values gets closer to the target level, each of the plurality of X-percent values being for a respective one of said at least one mobile station.

4. The wireless communication system according to claim 3, wherein the adjustment, by the first base station, includes adding a difference between the target level and the lowest value of the plurality of X-percent values to a current value of the transmission power.

5. The wireless communication system according to claim 1, wherein the first base station determines an initial value of the transmission power based on reception quality of a second signal transmitted from a second base station, and starts transmission with the initial value.

6. The wireless communication system according to claim 5, wherein reception quality of the second signal measured by the first base station is received power or a reception SIR.

7. The wireless communication system according to claim 5, wherein the first base station is a femto base station and the second base station is a macro base station.

8. The wireless communication system according to claim 1, wherein the first base station sets at least one of an upper threshold and a lower threshold of the transmission power based on reception quality of a second signal transmitted from a second base station, and adjusts the transmission power within a range between the maximum value and the minimum value.

9. The wireless communication system according to claim 1, wherein a measurement of a reception quality level of the first signal is performed while said at least one mobile station is communicating with the first base station, or by using completion of communication between said at least one mobile station with the first base station as a trigger.

10. The wireless communication system according to claim 1, wherein
if said at least one mobile station does not report the measurement result to the first base station within a predetermined time, the first base station instructs the mobile station that has not reported the measurement result yet to measure a reception quality level of the first signal, and
the mobile station performs a measurement of the reception quality level in response to the instruction.

11. The wireless communication system according to claim 1, wherein the first base station prevents a ratio of transmission power of the first signal to total transmission power in a first cell generated by the first base station from falling below a predetermined value.

12. The wireless communication system according to claim 1, wherein a CDMA mode is used as a wireless access mode.

13. The wireless communication system according to claim 1, wherein the first base station, and said at least one mobile station transmit information by using at least one resource block among a plurality of resource blocks dividing a radio frequency band.

14. The wireless communication system according to claim 1, wherein the first base station is a femto base station.

15. The wireless communication system according to claim 1, wherein the first signal is a femto cell common pilot signal and the second signal is a macro cell common pilot signal.

16. A wireless communication method comprising:
measuring, by at least one mobile station, a reception quality level of a first signal from a first base station and reporting a measurement result of the reception quality level to the first base station; and
adjusting, by the first base station, transmission power of the first base station based on a plurality of reception quality levels of the first signal measured by the at least one mobile station so that a lowest level from among the plurality of reception quality levels gets closer to a predetermined target level,
wherein the at least one mobile station is pre-registered with the first base station to connect to and communicate with the first base station,
said adjusting includes increasing the transmission power if the lowest level from among the plurality of reception quality levels is smaller than the predetermined target level, and
said adjusting includes decreasing the transmission power if the lowest level from among the plurality of reception quality levels is larger than the predetermined target level.

17. The wireless communication method according to claim 16, wherein the first base station sets at least one of a maximum value and a minimum value of the transmission power based on reception quality of a second signal transmitted from a second base station, and adjusts the transmission power within a range between the maximum value and the minimum value.

18. A base station used in a wireless communication system comprising:
a wireless communication unit being configured to transmit a first signal, and communicate with at least one mobile station; and
a setting unit being configured to adjust transmission power based on a plurality of reception quality levels of the first signal measured by said at least one mobile station so that a lowest level from among the plurality of reception quality levels gets closer to a predetermined target level,
wherein the at least one mobile station is pre-registered with the base station to connect to and communicate with the base station,
if the lowest level from among the plurality of reception quality levels is smaller than the predetermined target level, the setting unit increases the transmission power, and
if the lowest level from among the plurality of reception quality levels is larger than the predetermined target level, the setting unit decreases the transmission power.

19. The base station according to claim 18, wherein the setting unit sets at least one of a maximum value and a minimum value of the transmission power based on reception quality of a second signal transmitted from other base station, and adjusts the transmission power within a range between the maximum value and the minimum value.

20. A method of controlling a base station used in a wireless communication system comprising:
   transmitting a first signal, and communicating with at least one mobile station; and
   adjusting transmission power based on a plurality of reception quality levels of the first signal measured by said at least one mobile station so that a lowest level from among the plurality of reception quality levels gets closer to a predetermined target level,
   wherein the at least one mobile station is pre-registered with the base station to connect to and communicate with the base station,
   said adjusting includes increasing the transmission power if the lowest level from among the plurality of reception quality levels is smaller than the predetermined target level, and
   said adjusting includes decreasing the transmission power if the lowest level from among the plurality of reception quality levels is larger than the predetermined target level.

21. A non-transitory computer readable media storing a base station control program that causes a computer to execute control processing for a base station comprising wireless transmitting means, the control processing comprising:
   a process of causing the wireless transmitting means to transmit a first signal; and
   a process of adjusting transmission power in the wireless transmitting means based on a plurality of reception quality levels of the first signal measured by at least one mobile station so that a lowest level from among the plurality of reception quality levels gets closer to a predetermined target level,
   wherein the at least one mobile station is pre-registered with the base station to connect to and communicate with the base station,
   said adjusting includes increasing the transmission power if the lowest level from among the plurality of reception quality levels is smaller than the predetermined target level, and
   said adjusting includes decreasing the transmission power if the lowest level from among the plurality of reception quality levels is larger than the predetermined target level.

22. A base station used in a wireless communication system comprising:
   means for transmitting a first signal, and communicating with at least one mobile station; and
   means for adjusting transmission power based on a plurality of reception quality levels of the first signal measured by said at least one mobile station so that a lowest level from among the plurality of reception quality levels gets closer to a predetermined target level,
   wherein the at least one mobile station is pre-registered with the base station to connect to and communicate with the base station,
   if the lowest level from among the plurality of reception quality levels is smaller than the predetermined target level, said means for adjusting increases the transmission power, and
   if the lowest level from among the plurality of reception quality levels is larger than the predetermined target level, said means for adjusting decreases the transmission power.

* * * * *